(12) United States Patent
Kwok et al.

(10) Patent No.: US 7,223,460 B2
(45) Date of Patent: May 29, 2007

(54) RUBBER MODIFIED STYRENIC COPOLYMERS AND THEIR USE IN DISPOSABLE CARD APPLICATIONS

(75) Inventors: John Chi Hee Kwok, Moon Township, PA (US); Richard Delaney, Jr., Lunenburg, MA (US); Michael W. Desmarais, Hampton Falls, NH (US); Richard W. Desmarais, Manchester, NH (US)

(73) Assignee: NOVA Chemicals Inc., Moon Township, PA (US)

( * ) Notice: Subject to any disclaimer, the term of this patent is extended or adjusted under 35 U.S.C. 154(b) by 105 days.

(21) Appl. No.: 11/034,084

(22) Filed: Jan. 12, 2005

(65) Prior Publication Data

US 2006/0155063 A1    Jul. 13, 2006

(51) Int. Cl.
*C08L 53/02* (2006.01)
*C08L 51/00* (2006.01)

(52) U.S. Cl. .......................... 428/156; 252/88; 252/94; 252/98

(58) Field of Classification Search ................. 525/88, 525/94, 98; 428/156
See application file for complete search history.

(56) References Cited

U.S. PATENT DOCUMENTS

| | | | |
|---|---|---|---|
| 4,097,555 A * | 6/1978 | Moran | 525/84 |
| 4,530,973 A * | 7/1985 | Koster et al. | 525/310 |
| 4,598,123 A * | 7/1986 | Cutter | 525/84 |
| 4,772,667 A | 9/1988 | Biletch et al. | |
| 5,290,862 A | 3/1994 | Blasius | |
| 5,427,832 A | 6/1995 | Longtin | |
| 5,543,466 A | 8/1996 | Norman | |
| 5,891,962 A | 4/1999 | Otsuzuki et al. | |
| 5,982,888 A | 11/1999 | Luckeneder et al. | |
| 6,096,431 A | 8/2000 | Matsudaira et al. | |
| 6,346,572 B1 * | 2/2002 | Loth et al. | 525/94 |
| 6,422,459 B1 | 7/2002 | Kawan | |
| 6,572,021 B1 | 6/2003 | Lippert | |
| 2005/0271881 A1 * | 12/2005 | Hong | 428/423.1 |
| 2006/0011892 A1 * | 1/2006 | Powers | 252/397 |
| 2006/0105123 A1 * | 5/2006 | Camp | 428/34.2 |

* cited by examiner

*Primary Examiner*—Jeffrey Mullis
(74) *Attorney, Agent, or Firm*—Gary F. Matz

(57) ABSTRACT

A thermoplastic sheet that includes a continuous phase and a dispersed phase, where
A) the continuous phase contains a polymer composition resulting from the polymerization of a monomer mixture containing a styrenic monomer and an alkyl (meth) acrylate monomer in the presence of the dispersed phase; and
B) the dispersed phase contains one or more block copolymer selected from diblock and triblock copolymers of styrene-butadiene, styrene-butadiene-styrene, styrene-isoprene, styrene-isoprene-styrene, partially hydrogenated styrene-isoprene-styrene. The thermoplastic sheet is formed by extruding a thermoplastic composition that is cut to desired dimensions to form thermoplastic items, e.g. identification cards, credit cards, bank cards, key cards, gift cards, phone cards, playing cards, menus, and the like. Indicia and/or printing can be applied to the items to provide for commercial applications. The sheet may be opaque or may be relatively clear to transparent with a Haze value of 0.01% up to 10%.

16 Claims, No Drawings

RUBBER MODIFIED STYRENIC COPOLYMERS AND THEIR USE IN DISPOSABLE CARD APPLICATIONS

BACKGROUND OF THE INVENTION

1. Field of the Invention

The present invention is directed to thermoplastic sheets containing rubber modified styrenic copolymers and the use of said sheets in making thermoplastic items.

2. Description of the Prior Art

Plastic sheet laminates are commonly used in a variety of applications, including identification cards, credit cards, bank cards, key cards, gift cards and the like. Such laminates are generally comprised of a relatively thick core layer containing printed indicia on at least one side thereof, and a relatively thin, transparent layer laminated to each side of the core layer. For certain applications, particularly for credit cards, the laminate is embossed and the raised areas are typically printed or tipped with ink.

These laminates are typically made of plastic sheets containing various thermoplastic blends including primarily polyvinyl chloride homopolymers or copolymers. Typical credit card laminates require properties such as stiffness, impact strength, resilience and flexural durability sufficient to provide about a one- to two-year service life.

In some applications, the printing and/or printed indicia is applied on the protective or laminated layer and then reverse-laminated onto the core layer.

As an example, U.S. Pat. No. 5,543,466 to Norman discloses laminates for use in credit card applications that have at least one core layer and at least one over layer on each side. The core layer composition includes polyvinyl chloride, a copolymer derived from vinyl chloride and vinyl ester monomers, at least one acrylic resin polymer, as well as a copolymer derived from ethylene and vinyl acetate monomers. The core layer is corona treated in order to improve ink adhesion thereto. The overlay composition is similar but generally is transparent. The laminated credit card can optionally contain a magnetic strip on the over layer or a microchip therein.

A particular drawback to polyvinyl chloride based cards is their generally poor printability or ink acceptability. As indicated in the Norman patent, the core layer requires corona treatment in order to improve ink adhesion and is further totally laminated to protect the printed layer. The extra processing steps required for protective lamination add considerable cost to the final card. The elimination of these steps and their added cost is an ongoing objective in the art.

U.S. Pat. No. 4,772,667 to Biletch et al. discloses a thermoplastic polymer that includes a styrenic monomer, an acrylate, a methacrylate and a block copolymer.

U.S. Pat. No. 5,290,862 to Blasius discloses a polymer alloy that contains from 30 to 83 weight percent of a brittle polymer; from 3 to 50 weight percent of a rubbery polymer; and from 15 to 67 weight percent of a ductile polymer, provided that the ductile polymer and the rubbery polymer are at least compatible.

U.S. Pat. No. 5,891,962 to Otsuzuki et al. discloses a transparent, rubber-modified styrene resin that contains 70 to 96 parts by weight of a copolymer formed of 20 to 70 wt. % of styrene monomer units and 30 to 80 wt. % of alkyl (meth)acrylate monomer units and 4 to 30 parts by weight of a rubbery polymer. The rubbery polymer is dispersed in the copolymer as particles and the copolymer and the rubbery polymer have substantially the same refractive index.

Heretofore, the above described thermoplastic polymer compositions have not been used in sheet and/or disposable card applications because they do not provide the required stiffness, impact strength, resilience and flexural durability properties.

It would be desirable to provide a low cost thermoplastic sheet material that can be used in disposable card applications that provides sufficient stiffness, resilience and flexural durability properties, while also having ink printability and ink acceptability properties such that a lamination layer is not required to protect the printed image.

SUMMARY OF THE INVENTION

The present invention provides a thermoplastic sheet that includes a continuous phase and a dispersed phase, where:

A) the continuous phase contains a polymer composition resulting from the polymerization of a monomer mixture including (i) from about 25 to 75 parts by weight of a styrenic monomer and (ii) from about 25 to 75 parts by weight of an alkyl(meth)acrylate monomer, wherein the alkyl group is a $C_1$ to $C_{12}$ linear, branched or cyclic alkyl group, in the presence of the dispersed phase; and B) the dispersed phase contains from about 2 to about 50 parts by weight of one or more block copolymers selected from diblock and triblock copolymers of styrene-butadiene, styrene-butadiene-styrene, styrene-isoprene, styrene-isoprene-styrene, partially hydrogenated styrene-isoprene-styrene, for a total of 100 parts by weight of the combination of A) and B).

The present invention also provides a method of making a thermoplastic item, e.g. card. The method includes the steps of:

extruding a thermoplastic composition to form the above-described thermoplastic sheet, cutting the sheet to form a thermoplastic item of desired dimensions;

printing on a surface of the item; and optionally laminating the item.

The present invention is additionally directed to thermoplastic items made according to the above-described method.

DETAILED DESCRIPTION OF THE INVENTION

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass, without limitation, homopolymers, copolymers and graft copolymers.

Unless otherwise specified, all molecular weight values are determined using gel permeation chromatography (GPC) using appropriate polystyrene standards. Unless otherwise indicated, the molecular weight values indicated herein are weight average molecular weights (Mw).

In making the present thermoplastic sheet, a particular thermoplastic composition is used. The thermoplastic composition is characterized as having a continuous phase and a dispersed phase. The continuous phase contains a polymer composition resulting from the polymerization of a monomer mixture containing styrenic and alkyl(meth)acrylate monomers in the presence of the dispersed phase.

The styrenic monomers are present in the monomer mixture at a level of at least 25, in some cases at least 30 and in other cases at least 35 parts by weight based on the combined weight of the monomer mixture and the dispersed phase. Also, the styrenic monomers are present in the monomer mixture at a level of up to 75, in some cases up to 70, in other cases up to 65, in some instances up to 60, in other instances up to 55 and in particular situations up to 50 parts by weight based on the combined weight of the monomer mixture and dispersed phase. The amount of styrenic monomer is determined based on the physical properties desired in the resulting thermoplastic sheet. The amount of styrenic monomer in the monomer mixture can be any value recited above or can range between any of the values recited above.

The alkyl(meth)acrylate monomers are present in the monomer mixture at a level of at least 25, in some cases at least 30 and in other cases at least 35 parts by weight based on the combined weight of the monomer mixture and dispersed phase. Also, the alkyl(meth)acrylate monomers are present in the monomer mixture at a level of up to 75, in some cases up to 70, in other cases up to 65, in some instances up to 60, in other instances up to 55 and in particular situations up to 50 parts by weight based on the combined weight of the monomer mixture and dispersed phase. The amount and type of alkyl(meth)acrylate monomers is determined based on the physical properties desired in the resulting thermoplastic sheet. The alkyl group in the alkyl(meth)acrylate monomers can be a $C_1$ to $C_{12}$, in some cases a $C_1$ to $C_8$ and in other cases a $C_1$ to $C_4$ linear, branched or cyclic alkyl group. The amount and type of alkyl(meth)acrylate monomers in the monomer mixture can be any value recited above or can range between any of the values recited above.

In an embodiment of the invention, the styrenic monomer is selected from styrene, p-methyl styrene, tertiary butyl styrene, dimethyl styrene, nuclear brominated or chlorinated derivatives thereof and combinations thereof.

In another embodiment of the invention, the alkyl(meth)acrylate monomers include methylmethacrylate and optionally butyl acrylate.

In an embodiment of the invention, the monomer mixture includes one or more chain transfer agents. Any chain transfer agent that effectively controls the molecular weight of the styrenic/alkyl(meth)acrylate copolymers can be used in the invention. Non-limiting examples of suitable chain transfer agents include alkyl mercaptans according to the structure R—SH, where R represents a $C_1$ to $C_{32}$ linear, branched or cyclic alkyl or alkenyl group; mercaptoacids according to the structure HS—R—COOX, where R is as defined above and X is H, a metal ion, $N^+H_4$ or a cationic amine salt; dimers or cross-dimers of α-methylstyrene, methyl methacrylate, hydroxy ethylacrylate, benzyl methacrylate, allyl methacrylate, methacrylonitrile, glycidyl methacrylate, methacrylic acid, tert-butyl methacrylate, isocyanatoethyl methacrylate, meta-isopropenyl-α,α-dimethyl isocyanate, ω-sulfoxyalkyl methacrylates and alkali salts thereof. Suitable dimers that can be used in the invention are disclosed, for example, in U.S. Patent Application Publication No. 2004/0176527, the relevant portions of which are herein incorporated herein by reference.

When used, the one or more chain transfer agents may be present in the monomer mixture at a level of from at least 0.001 wt. %, in some cases at least 0.01 wt. % and in other cases at least 0.1 wt. % and up to 10 wt. %, in some cases up to 7.5 wt. % and in other cases up to 5 wt. % of the monomer mixture. The amount of chain transfer agent can be any value or can range between any of the values recited above.

The dispersed phase is present in the thermoplastic composition at a level of at least 2 parts by weight, in some cases at least 3 parts by weight, in other cases at least 5 parts by weight, and in some situations at least 10 parts by weight based on the combined weight of the monomer mixture and dispersed phase. Also, the dispersed phase is present in the thermoplastic composition at a level of up to 50 parts by weight, in some cases up to 45 parts by weight, in other cases up to 40 parts by weight, in some instances up to 35 parts by weight, in other instances up to 30 parts by weight, and in particular situations up to 25 parts by weight based on the combined weight of the monomer mixture and dispersed phase. The amount of dispersed phase is determined based on the physical properties desired in the resulting thermoplastic sheet. The amount of dispersed phase in the thermoplastic composition can be any value recited above or can range between any of the values recited above.

The dispersed phase desirably contains one or more block copolymers, which can be rubbery block copolymers. Desirably, the block copolymers include one or more diblock and triblock copolymers of styrene-butadiene, styrene-butadiene-styrene, styrene-isoprene, styrene-isoprene-styrene and partially hydrogenated styrene-isoprene-styrene. Examples of suitable block copolymers include, but are not limited to, the STEREON® block copolymers available from the Firestone Tire and Rubber Company, Akron Ohio; the ASAPRENE™ block copolymers available from Asahi Kasei Chemicals Corporation, Tokyo Japan; the KRATON® block copolymers available from Kraton Polymers, Houston, Tex.; and the VECTOR® block copolymers available from Dexco Polymers LP, Houston, Tex.

In an embodiment of the invention, the block copolymer is a linear or radial block copolymer.

In an embodiment of the invention, the block copolymer has a weight average molecular weight of at least 50,000 and in some cases not less than about 75,000, and can be up to 500,000, in some cases up to 400,000 and in other cases up to 300,000. The weight average molecular weight of the block copolymer can be any value or can range between any of the values recited above.

In another embodiment of the invention, the block copolymer is a triblock styrene-butadiene-styrene or styrene-isoprene-styrene copolymer having a weight average molecular weight of from about 175,000 to about 275,000.

In a further embodiment of the invention, at least some of the polymers in the continuous phase are grafted onto the block copolymer in the dispersed phase.

In an embodiment of the invention, the dispersed phase is present as discrete particles dispersed within the continuous phase. Further to this embodiment, the volume average particle size of the dispersed phase in the continuous phase is at least about 0.1 μm, in some cases at least 0.2 μm and in other cases at least 0.25 μm. Also, the volume average particle size of the dispersed phase in the continuous phase can be up to about 2 μm, in some cases up to 1.5 μm and in other cases up to 1 μm. The particle size of the dispersed phase in the continuous phase can be any value recited above and can range between any of the values recited above.

In another embodiment of the invention, the aspect ratio of the discrete particles is from at least about 1, in some cases at least about 1.5 and in other cases at least about 2 and can be up to about 5, in some cases up to about 4 and in other cases at least up to about 3. When the aspect ratio of the dispersed particles is too large, the resulting thermoplastic sheet is hazy and not clear or transparent. The aspect ratio of the dispersed discrete particles can be any value or range between any of the values recited above. As a non-limiting example, the aspect ratio can be measured by scanning electron microscopy or light scattering.

The particle size and aspect ratio of the dispersed phase can be determined using low angle light scattering. As a non-limiting example, a Model LA-910 Laser Diffraction Particle Size Analyzer available from Horiba Ltd., Kyoto, Japan can be used. As a non-limiting example, a rubber-modified polystyrene sample can be dispersed in methyl ethyl ketone. The suspended rubber particles can then be placed in a glass cell and subjected to light scattering. The scattered light from the particles in the cell can be passed through a condenser lens and converted into electric signals by detectors located around the sample cell. As a non-limiting example, a He—Ne laser and/or a tungsten lamp can be used to supply light with a shorter wavelength. Particle size distribution can be calculated based on Mie scattering theory from the angular measurement of the scattered light.

The thermoplastic composition is formed by dispersing the dispersed phase in a monomer mixture containing styrenic and alkyl(meth)acrylate monomers, deaerating or sparging with nitrogen, while mixing and adding a suitable free radical polymerization initiator at a suitable temperature to effect free radical polymerization. In an embodiment of the invention, at least some of the monomer mixture reacts with unsaturated groups in the dispersed phase to provide grafting to the dispersed phase. Methods for polymerizing the monomer mixture and dispersed phase are known in the art. Examples of such methods are disclosed in, as non-limiting examples, U.S. Pat. No. 4,772,667 to Biletch et al., and U.S. Pat. No. 5,891,962 to Otsuzuki et al., the relevant portions of which are herein incorporated by reference. Desirably, the manufacturing conditions are adapted to provide thermoplastic compositions, thermoplastic sheets and thermoplastic items having the properties described herein.

Any suitable polymerization initiator can be used in the invention. Non-limiting examples of suitable polymerization initiators include dibenzoyl peroxide, di-tert-butyl peroxide, dilauryl peroxide, dicumyl peroxide, didecanoyl peroxide, tert-butyl peroxy-2-ethylhexanoate, tert-butyl perpivalate, tert-butyl peroxyacetate, or butyl peroxybenzoate and also azo compounds, e.g., 2,2'-azobis(2,4-dimethylvaleronitrile), 2,2-azobis-(isobutyronitrile), 2,2'-azobis(2,3-dimethylbutyronitrile), 1,1'-azobis-(1-cyclohexanenitrile), as well as combinations of any of the above.

In an embodiment of the invention, the difference between the refractive index of the continuous phase and the dispersed phase is not more than 0.01 and in some cases not more than 0.001.

In an embodiment of the invention, the adjuvants include pigments or colorants or both. The pigments and/or colorants can be included in the thermoplastic composition and are included as part of the resulting thermoplastic sheet. As non-limiting examples, the pigments and/or colorants can include titanium dioxide. The pigments and/or colorants when added to the thermoplastic composition will generally result in an opaque sheet. A clear or transparent sheet can be defined as having Haze values of 10% or less, and it is known to those skilled in the art that Haze values generally do not apply to an opaque sheet.

As used herein, "pigments and/or colorants" refer to any suitable inorganic or organic pigment or organic dyestuff. Suitable pigments and/or colorants are those that do not adversely impact the desirable physical properties of the thermoplastic sheet. Non-limiting examples of inorganic pigments include titanium dioxide, iron oxide, zinc chromate, cadmium sulfides, chromium oxides and sodium aluminum silicate complexes. Non-limiting examples of organic type pigments include azo and diazo pigments, carbon black, phthalocyanines, quinacridone pigments, perylene pigments, isoindolinone, anthraquinones, thioindigo and solvent dyes.

In another embodiment of the invention, the adjuvants can include one or more additives selected from lubricants, fillers, light stabilizers, heat stabilizers, surface-active agents, and combinations thereof. These additives, when added to the thermoplastic composition will generally result in an opaque sheet.

Suitable fillers are those that do not adversely impact, and in some cases enhance, the desirable physical properties of the thermoplastic sheet. Suitable fillers include, but are not limited to, calcium carbonate in ground and precipitated form, barium sulfate, talc, glass, clays such as kaolin and montmorolites, mica, and combinations thereof.

Suitable lubricants include, but are not limited to, ester waxes such as the glycerol types, the polymeric complex esters, the oxidized polyethylene type ester waxes and the like, metallic stearates such as barium, calcium, magnesium, zinc and aluminum stearate, and/or combinations thereof.

Generally, any conventional ultra-violet light (UV) stabilizer known in the art can be utilized in the present invention. Non-limiting examples of suitable UV stabilizers include 2-hydroxy-4-(octyloxy)-benzophenone, 2-hydroxy-4-(octyloxy)-phenyl phenyl-methanone, 2-(2'-hydroxy-3,5'di-ter-amylphenyl) benzotriazole, and the family of UV stabilizers available under the trade TINUVIN® from Ciba Specialty Chemicals Co., Tarrytown, N.Y.

Heat stabilizers that can be used in the invention include, but are not limited to, hindered phenols, non-limiting examples being the IRGANOX® stabilizers and antioxidants available from Ciba Specialty Chemicals.

When any or all of the indicated adjuvants are used in the present invention, they can be used at a level of at least 0.01 weight percent, in some cases at least 0.1 weight percent and in other cases at least 0.5 and up to 10 weight percent, in some cases up to 7.5 weight percent, in other cases up to 5 weight percent, and in some situations up to 2.5 weight percent of the thermoplastic composition and/or the thermoplastic sheet of the invention. The amount, type and combination of adjuvants used will depend on the particular properties desired in the thermoplastic sheet. The amount of any single adjuvant or any combination of adjuvants can be any value recited above and can range between any of the values recited above.

Thorough mixing and dispersion of the additive in the thermoplastic composition is important, but otherwise processing conditions are similar to those typically employed in the art.

The present thermoplastic sheet is prepared by working the above-described thermoplastic composition to form the thermoplastic sheet. Desirably, the thermoplastic composition, along with any desired adjuvants and/or other polymers are combined, may be mixed on a heated mill roll or other compounding equipment, and the mixture cooled, granulated and extruded into a sheet. The formulation may be admixed in extruders, such as single-screw or double-screw extruders, compounded and extruded into pellets, which may be then re-fabricated. The extruder may also be used to extrude the composition as pipe, sheet, film or profile.

The thermoplastic composition can be extruded at a temperature that allows for formation of a sheet with the desired physical properties. In an embodiment of the invention, the thermoplastic composition is extruded at from at least about 400® F. (204° C.), in some cases at least about 450° F. (232° C.) and up to about 550° F. (288° C.), in some cases up to about 500° F. (260° C.). The extrusion temperature can be any temperature or range between any of the temperatures indicated above.

Films or sheets may be uniaxially or biaxially oriented either during extrusion or after such processing by reheating and stretching.

Granules of the thermoplastic composition may be molded or extruded into appropriate parisons which are then treated by conventional molding and blowing techniques into bottles or other containers, which containers may be stretch oriented uniaxially or biaxially, or may be left unoriented. It is known in the art for such containers to have closures that allow them to be sealed or capped.

Films or sheets may be treated with additives after forming, such as appropriate heat-seal adhesives, coatings for ink adhesions, printing, labels, and the like.

In an embodiment of the invention, the thermoplastic sheet has a melt flow of from at least about 1.0 g/10 minutes, in some cases at least about 2.5 g/10 minutes, and in other cases at least about 3 g/10 minutes, and up to about 10 g/10 minutes, in some cases up to 4.5 g/10 minutes, and in other cases up to 4 g/10 minutes measured according to ASTM D-1238. The melt flow of the thermoplastic sheet can be any value, or can range between any of the values recited above.

In an embodiment of the invention, a clear sheet is desired and/or required. For clear sheets, the thermoplastic sheet has a Haze value of from at least about 0.01% and can be up to about 10%, in some cases up to 7.5%, in other cases up to 5% and in some situations up to 4%. The Haze value of a sheet sample is measured using a ColorQuest®XE-Touch reflectance/transmittance spectrophotometer equipped with Universal® color quality control software, available from Hunter Associates Laboratory, Inc., Reston, Va. The Haze value of the thermoplastic sheet can be any value, or can range between any of the values recited above.

In an embodiment of the invention, the tensile strength (tensile break) of the thermoplastic sheet is at least about 3,500 psi, in some cases at least about 4,000 psi and in other cases at least about 5,000 psi and can be up to about 10,000 psi, in some cases up to 9,000 psi, in other cases up to 8,000 psi and in some situations up to 7,000 psi measured according to ASTM D-638. The tensile strength of the thermoplastic sheet can be any value, or can range between any of the values recited above.

In an embodiment of the invention, the flexural modulus tensile of the thermoplastic sheet is at least about 100,000 psi, in some cases at least about 200,000 psi and in other cases at least about 300,000 psi and can be up to about 700,000 psi, in some cases up to 600,000 psi, in other cases up to 500,000 psi and in some situations up to 400,000 psi measured according to ASTM D-790. The tensile strength of the thermoplastic sheet can be any value, or can range between any of the values recited above.

In an embodiment of the invention, the thermoplastic sheet can have a thickness of at least about 0.05 mm, in some cases at least about 0.1 mm and in other cases at least about 0.25 mm and can be up to about 5 mm, in some case up to about 4 mm and in other cases up to about 5 mm. The thickness of the thermoplastic sheet can vary depending on its intended use. The thickness of the thermoplastic sheet can be any value or can range between any of the values recited above.

Once formed, printing can be applied to the present thermoplastic sheet. Typically, a printed layer is applied over at least a portion of a surface of the thermoplastic sheet. The printed layer can be applied using art known methods, not limited to, offset printing, gravure printing, stamping, and the like.

In an embodiment of the invention, the surface of the sheet can be treated prior to printing. Any suitable surface treatment that improves the quality of the printing and/or improves the printability of the sheet surface can be used. As a non-limiting example, the surface treatment can be an oxidative surface treatment, a non-limiting example being corona discharge, which can be used to improve ink receptivity prior to printing. As a non-limiting example, the corona treatment can be applied using one of the UNI-DYNE® corona systems available from Corotec Corporation, Farmington, Conn.

Desirably, the printed layer includes an ink composition. Any suitable ink composition known in the art can be used, so long as the ink composition is substantive to the thermoplastic sheet.

In an embodiment of the invention, the thermoplastic sheet has a Fatigue Test value of at least about 5,000 cycles, in some cases at least about 10,000 cycles and in other cases at least about 15,000 cycles. The Fatigue Test is meant to simulate card use, for example the action of inserting a key card into a slot opening. The Fatigue Test or assessment of the flexural fatigue properties of an extruded sheet can be conducted using a servo-hydraulic load frame. The intent is to simulate the incomplete or obstructed insertion of a keycard into a reader. Specimens are cut one inch in width, with one end clamped to a reciprocating hydraulic actuator while the other is fed into a stationary blind slot. The actuator is cycled over about a 0.75-inch stroke, with about 3.75 inches of unsupported sheet. The resultant deflection at mid-span of the sheet is about 0.75 inches. This flexing action is repeated at 120 cycles per minute until the sheet fails. In particular embodiments of the invention, the sheet lasts at least and sometimes in excess of 30,000 cycles.

In an embodiment of the invention, physical indicia, such as magnetic strips, code bars, pictures, microchips, computer printed pictures and other information, can also be applied to a surface of the thermoplastic sheet. The indicia can be laminated with or without adhesives to the thermoplastic sheet.

In a particular embodiment of the invention, the magnetic strip is applied and/or adhered to a surface of the thermoplastic sheet.

In another particular embodiment, a computer chip or microchip can be utilized where a portion of the thermoplastic sheet, the same size and thickness and shape as the computer chip or microchip, is removed, and a computer chip or microchip is adhered to the thermoplastic sheet.

Aspects of the present invention also provide a method of making a thermoplastic item including the steps of:
- extruding a thermoplastic composition to form a thermoplastic sheet where the thermoplastic composition and extrusion are as described above;
- optionally surface treating the extruded sheet;
- cutting the sheet to form a smaller sheet of desired dimensions;
- printing on a surface of the smaller sheet;
- optionally cutting the smaller sheet to desired item dimensions; and
- optionally laminating the item.

Depending on the particular manufacturing configuration, the thermoplastic sheet can be printed and then cut, or cut and then printed, or printed, cut and then printed again. Thus the order of the cutting, printing and laminating steps can be changed to suit the available equipment or desired item. The thermoplastic items made according to the present method can include many commonly used articles. As non-limiting examples, the thermoplastic items can include identification cards, credit cards, bank cards, key cards, gift cards, phone cards, playing cards, menus, game pieces, signs, decorations, and the like.

Any surface treatment that improves printability and/or print quality can be used. In an embodiment of the invention, the surface treatment is an oxidative surface treatment, as a non-limiting example, the surface treatment can include corona discharge treatment as described above.

Any suitable method can be used to cut the thermoplastic sheet. Suitable methods include, but are not limited to, die-cutting, knifes, blades and saws.

In an embodiment of the invention, the thermoplastic sheets can be cut into individual cards, embossed with a name, account number or other desired information. The raised surfaces of the embossed information can be tipped with ink if desired.

Optionally, the item can be laminated, where the lamination includes adding physical indicia selected from magnetic strips, code bars, pictures, microchips, images, and combinations thereof to the item.

Thus, the present invention provides an item made according to the above-described method. The item can be any desired shape, depending on its desired use. The shape of the item can be, without limitation, rectangular, square, circular, oval, round, triangular, trapezoidal, a parallelogram, pentagonal, hexagonal, octagonal and any combination of such shapes.

In an embodiment of the invention, the item is rectangular, can be used as a card, and can have a first dimensional length of from about 2 cm to about 15 cm, a second dimension of from about 1 cm to about 12 cm, and a thickness of from about 0.05 mm to about 5 mm.

The physical indicia on the item can include, but is not limited to, magnetic strips, code bars, pictures, microchips, images, and combinations thereof that are affixed to the item. The physical indicia can be applied to the thermoplastic sheet before it is cut or to the item after the sheet is cut.

When the item is embossed, the item is formed so that a portion of the thermoplastic composition is raised above a plane of the item. The raised portion can be in the form of characters, numbers and/or letters.

The thermoplastic sheets, items and cards of the present invention readily receive ink and other printing, which generally does not smear after it has been applied and allowed to dry and/or cure. The thermoplastic sheets, items and cards provide sufficient stiffness, impact strength, resilience, flexural durability properties and ink printability and ink acceptability properties, are typically low cost and thus are suitable for use in disposable or limited use applications. Although surface treatment and/or lamination layers can be used, they are generally not required to protect the printed image.

The present invention will further be described by reference to the following examples. The following examples are merely illustrative of the invention and are not intended to be limiting. Unless otherwise indicated, all percentages are by weight.

EXAMPLES

The test methods used to evaluate the thermoplastic sheets were:
Graves Tear—ASTM D-1004
Trousers Tear—ASTM D-1938
Tensile Test—ASTM D-638
Flexural modulus—ASTM D-790
Impact (Instrumented Impact)—ASTM D-3763
Haze of a sheet sample was measured using a ColorQuest®XE-Touch reflectance/transmittance spectrophotometer equipped with Universal Software® color quality control software, available from Hunter Associates Laboratory, Inc., Reston, Va.

Example 1 (Comparative)

A high impact polystyrene composition was prepared by polymerizing a mixture containing 92 wt. % styrene and 8% polybutadiene rubber using tert butyl peroxyacetate as initiator and extruding the polymer to form a sheet 20 mils thick.

Example 2 (Comparative)

A high impact polystyrene composition was prepared by polymerizing a mixture containing 90.75 wt. % polystyrene and 9.25% polybutadiene rubber using tert butyl peroxyacetate as initiator and extruding the polymer to form a sheet 20 mils thick.

Example 3 (Invention)

A thermoplastic composition of the present invention was prepared by polymerizing 47 wt. % styrene, 33.5 wt. % methyl methacrylate and 5 wt. % butyl acrylate in the presence of 14.5 wt. % styrene-butadiene block copolymer with an average styrene content of 39.75 wt. % using tert butyl peroxyacetate as initiator. The resulting product was clear. The thermoplastic composition was then extruded to form a sheet 20 mils thick.

Results for Examples 1-3 are shown in Table 1:

TABLE 1

|  | Example 1 | Example 2 | Example 3 |
|---|---|---|---|
| Tensile Stress @ Yield, KSI (MD) | 3.5 | 3.9 | 6.6 |
| Tensile Strain @ Break, % (MD) | 106.4 | 92.7 | 94.8 |
| Tensile Stress @ Yield, KSI (TD) | 3.0 | 3.7 | 6.6 |
| Tensile Strain @ Break, % (TD) | 100.7 | 87.7 | 62.8 |
| Flexural - Max Load, lb. (MD) | 5.8 | 6.3 | 9.9 |
| Flexural - Max Load, lb. (TD) | 6.6 | 6.9 | 10.4 |
| Instrumented Impact Resistance - Maximum Load, lb. | 169.2 | 164.3 | 168.8 |
| Instrumented Impact Resistance - Total Energy, ft-lb. | 4.0 | 4.0 | 3.2 |
| Graves Tear, lb. (parallel to MD) | 18.5 | 18.2 | 28.6 |
| Graves Tear, lb. (perpendicular to MD) | 16.9 | 17.3 | 27.2 |
| Trousers Tear, lb. (MD) | 0.8 | 0.9 | 1.9 |
| Trousers Tear, lb. (TD) | 1.2 | 2.1 | 1.9 |

MD denotes the machine direction of the sheet. TD denotes the transverse direction of the sheet. The thermoplastic sheets made with the rubber modified styrene acrylic copolymer (Example 3) were stiffer than the comparative samples (Examples 1 and 2) as shown by tensile stress at yield and flexural strength. Similar impact resistance (or toughness) was shown by the Instrumented Impact Resistance, and significantly better tear resistance was shown by the Graves Tear and Trousers Tear results.

Example 4 (Invention)

A sample was prepared as in Example 3, except that 5% titanium dioxide, as a pigment, was included in the thermoplastic composition. This material was extruded to form an opaque sheet measuring 24 mils thick.

Printing was applied to the thermoplastic sheets of Example 4 and evaluated according to ASTM D 3359-02 (method B). No printing was removed after ten repetitions of tape adhesion and removal. Additionally, rubbing the printed area with a finger did not smudge or smear the printed image.

Examples 5 (Comparative)

Example 5 is a commercially available vinyl chloride-vinyl acetate copolymer (Oxy 1710, Occidental Petroleum Corp., Los Angeles, Calif.) extruded to 26 mils thick.

The Fatigue Test was an assessment of the flexural fatigue properties of extruded sheets. It was conducted using a servo-hydraulic load frame. The intent was to simulate the incomplete or obstructed insertion of a keycard into a reader. Specimens were cut one inch in width, with one end clamped to a reciprocating hydraulic actuator while the other was fed into a stationary blind slot. The actuator was cycled over a 0.75-inch stroke, with 3.75 inch of unsupported sheet. The resultant deflection at mid span of the sheet was 0.75 inches. This flexing action was repeated at 120 cycles per minute until the sheet failed. Comparative results for the thermoplastic sheets in Examples 3-5 are summarized in Table 2, where the Graves Tear results are normalized to 20 mils.

TABLE 2

|  | Example 5 | Example 4 | Example 3 |
|---|---|---|---|
| Fatigue Test, Cycles to Failure | 7000 | 30000 | Not Tested |
| Graves Tear (parallel to MD), lb. | 35.5 | 22.7 | 28.6 |
| Graves Tear (perpendicular to MD), lb. | 33.5 | 20.1 | 27.2 |

The results show that the thermoplastic sheets according to the invention provide adequate unilateral tear results and surprisingly good Fatigue Test (flex resistance) results while being able to be used as a one layer (no lamination) printed card.

The present invention has been described with reference to specific details of particular embodiments thereof. It is not intended that such details be regarded as limitations upon the scope of the invention except insofar as and to the extent that they are included in the accompanying claims.

We claim:

1. A rectangular card made according to a method comprising:
   extruding a thermoplastic composition to form a thermoplastic sheet, wherein the thermoplastic composition comprises a continuous phase and a dispersed phase, wherein
   A) the continuous phase comprises a polymer composition resulting from the polymerization of a monomer mixture comprising (i) from about 25 to 75 parts by weight of a styrenic monomer and (ii) from about 25 to 75 parts by weight of an alkyl(meth)acrylate monomer, wherein the alkyl group is a $C_1$ to $C_{12}$ linear, branched or cyclic alkyl group, in the presence of the dispersed phase; and
   B) the dispersed phase comprises from about 2 to about 50 parts by weight of one or more block copolymers selected from the group consisting of diblock and triblock copolymers of styrene-butadiene, styrene-butadiene-styrene, styrene-isoprene, styrene-isoprene-styrene, partially hydrogenated styrene-isoprene-styrene, for a total of 100 parts by weight of the combination of A) and B);
   optionally surface treating the extruded sheet;
   cuffing the sheet to form a smaller sheet of desired dimensions;
   printing on a surface of the smaller sheet;
   optionally cutting the smaller sheet to desired item dimensions; and
   optionally laminating the item;
   wherein the card is formed so that a portion of the thermoplastic composition is raised above a plane of the card to form characters.

2. The card according to claim 1, wherein the characters are in the form of numbers and/or letters.

3. The card according to claim 1, wherein the dispersed phase B) is present as discrete particles dispersed within the continuous phase A).

4. The card according to claim 3, wherein the volume average particle size of the dispersed phase B) is from about 0.1 µm to about 2 µm.

5. The card according to claim 1, wherein the difference between the refractive index of the continuous phase A) and the dispersed phase B) is not more than 0.01.

6. The card according to claim 1, wherein the styrenic monomer is selected from the group consisting of styrene, p-methyl styrene, tertiary butyl styrene, dimethyl styrene, nuclear brominated or chlorinated derivatives thereof and combinations thereof.

7. The card according to claim 1, wherein the alkyl(meth)acrylate monomer comprises methylmethacrylate and optionally butyl acrylate.

8. The card according to claim 1, wherein the block copolymer has a weight average molecular weight of not less than about 75,000.

9. The card according to claim 1, wherein the block copolymer is a linear or radial block copolymer.

10. The card according to claim 1, wherein the block copolymer is a triblock styrene-butadiene-styrene or styrene-isoprene-styrene copolymer having a weight average molecular weight of from about 175,000 to about 275,000.

11. The card according to claim 1, wherein at least some of the polymers in A) are grafted onto the block copolymer in B).

12. The card according to claim 1, having a thickness of from about 0.05 mm to about 5 mm.

13. The card according to claim 1, wherein the card is an opaque card further comprising pigments or colorants or both.

14. The card according to claim 1, wherein the card is an opaque card further comprising one or more additives selected from the group consisting of lubricants, fillers, light stabilizers, heat stabilizers, surface active agents, and combinations thereof.

15. The card according to claim 1, wherein the monomer mixture further comprises a chain transfer agent.

16. The card according to clam 1, having a first dimensional length of from about 2 cm to about 15 cm, a second dimension of from about 1 cm to about 12 cm and a thickness of from about 0.05 mm to about 5 mm.

* * * * *